(12) United States Patent
Gage et al.

(10) Patent No.: US 6,286,891 B1
(45) Date of Patent: Sep. 11, 2001

(54) REMOVABLE FRONT CAMPER SHELL WINDOW ASSEMBLY

(76) Inventors: Gregory Otis Gage; Dean Joseph Storholt, both of 4509 C Alameda Blvd. NE., Albuquerque, NM (US) 87113

( * ) Notice: Subject to any disclaimer, the term of this patent is extended or adjusted under 35 U.S.C. 154(b) by 0 days.

(21) Appl. No.: 09/522,738

(22) Filed: Mar. 10, 2000

(51) Int. Cl.$^7$ .................................................. B60P 3/373
(52) U.S. Cl. ..................... 296/166; 296/164; 296/190.1; 296/146.15; 49/380; 52/204.51
(58) Field of Search ................................... 296/164, 166, 296/190.1, 146.15, 146.16, 24.1; 49/380, 504, 324, 141, 404, 501; 52/204.51

(56) References Cited

U.S. PATENT DOCUMENTS

| | | |
|---|---|---|
| 371,560 | 10/1887 | Edington . |
| 590,086 | 9/1897 | Bohrisch . |
| 1,271,174 | 7/1918 | Klayman . |
| 3,321,234 | 5/1967 | Harrell et al. . |
| 3,711,995 * | 1/1973 | Anderson ............................... 49/504 |
| 3,739,527 | 6/1973 | Schubach . |
| 3,770,312 | 11/1973 | Shadburn . |
| 3,905,154 * | 9/1975 | Anderson ............................... 49/504 |
| 4,104,825 * | 8/1978 | Hosmer ................................... 49/324 |
| 4,554,770 * | 11/1985 | Anders ................................... 49/404 |
| 4,671,560 * | 6/1987 | Peti et al. .............................. 296/166 |
| 4,788,796 * | 12/1988 | Matthews ............................... 49/404 |
| 5,046,284 | 9/1991 | Harper . |
| 5,192,112 * | 3/1993 | Gherardi et al. .................. 296/190.1 |
| 5,238,288 * | 8/1993 | Chandler .............................. 296/164 |
| 5,263,757 * | 11/1993 | Reed .................................... 296/24.1 |
| 5,315,798 * | 5/1994 | Zarwell ............................. 52/204.51 |
| 5,454,193 * | 10/1995 | Hrifko ................................... 49/501 |
| 5,490,704 * | 2/1996 | Calnan ............................... 296/24.1 |
| 5,788,319 * | 8/1998 | Pruitt ................................... 296/164 |

* cited by examiner

Primary Examiner—Joseph D. Pape
Assistant Examiner—Kiran B. Patel
(74) Attorney, Agent, or Firm—Robert W. Harris

(57) ABSTRACT

A multi-purpose camper shell front window and frame assembly, for allowing quick and easy removal of a front camper shell window, without removal of the camper shell from the truck, to facilitate cleaning of the truck window and camper shell window; and for allowing use of one's choice among multiple front camper shell windows, including a picture window or a double pane sliding window; or for allowing use of a front pressure boot. A one piece outer frame assembly is readily secured to, or removed from, the camper shell front window aperture, and the picture window, sliding window, or pressure boot may be readily be installed within, or removed from, the outer frame assembly. Removal and reinstallation of a camper shell window, may easily be accomplished, without any special tools, in less than half an hour.

11 Claims, 5 Drawing Sheets

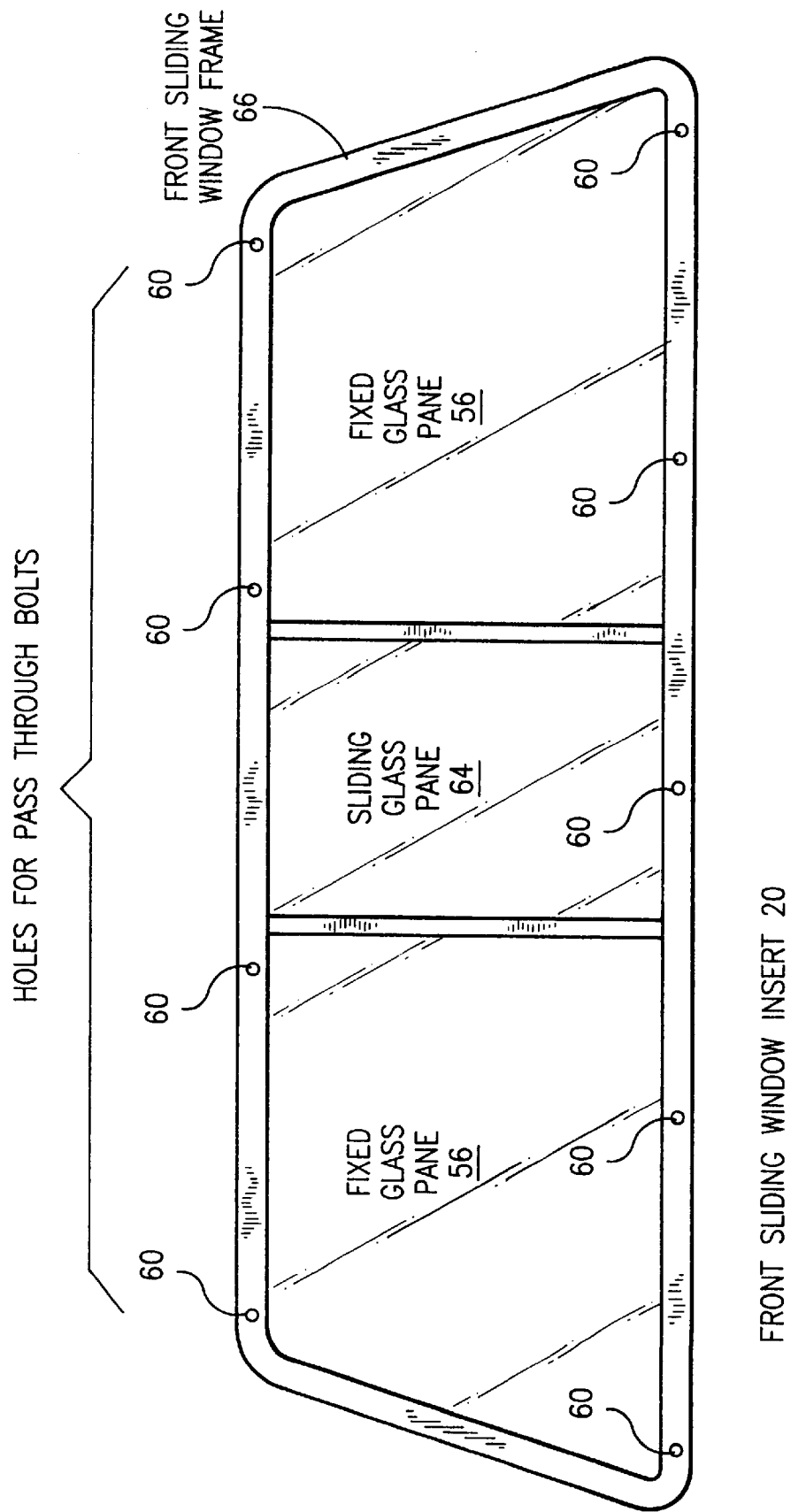

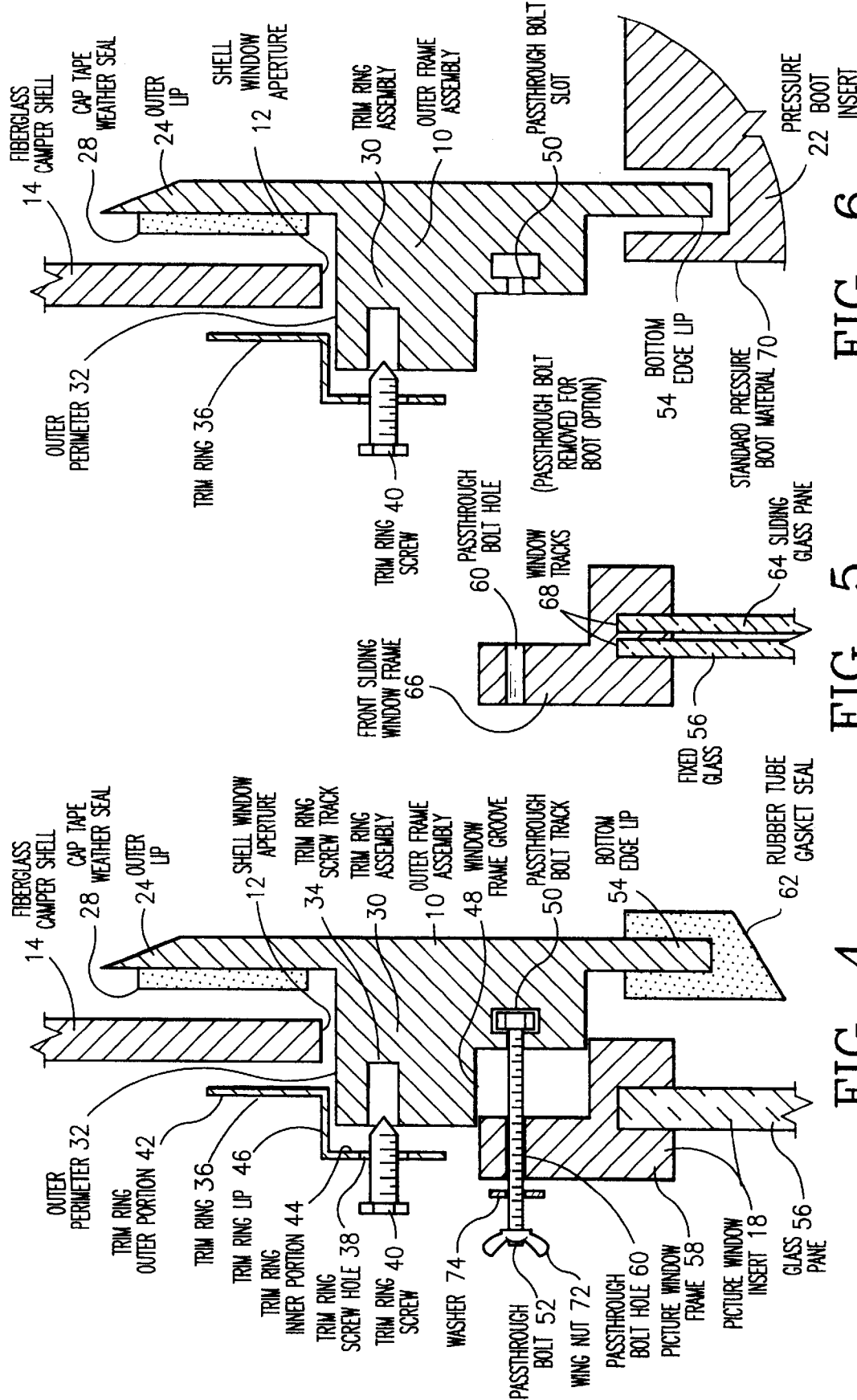

REMOVABLE FRONT CAMPER SHELL WINDOW ASSEMBLY

BACKGROUND OF THE INVENTION

The invention pertains to camper shell windows, and more particularly to apparatus for allowing quick removal of a front camper shell window.

The camper shell is a popular product, since the shell, installed over the bed of a pickup truck, allows the truck bed to be used for camping and sleeping shelter, without need for a more expensive recreational vehicle.

One problem encountered in use of the camper shell, however, is that there is only a small space between the front camper shell window and the rear window of the truck cab. The truck window and the camper shell window become soiled by airborne road grime and need periodic cleaning, but this space is too small to allow the cleaning to be done effectively, without removal of the camper shell front window or removal of the camper shell.

Removal of the camper shell front window or the camper shell, to allow cleaning of the two windows, is a lengthy undertaking with conventional camper shells.

So there is a need for a camper shell front window assembly allowing easy and quick removal of the camper shell window, to allow cleaning of the truck window and camper shell window.

And, for some camper shell users, there is also a need for such an assembly in order to allow for changing among different kinds of camper shell windows, or changing from a window to a pressure boot.

These needs are met by the present invention, through use of an outer frame assembly, readily installed in or removed from the camper shell front window aperture, and alternate camper shell windows, or a pressure boot, readily installed in or removed from the outer frame assembly.

SUMMARY OF THE INVENTION

The invention is a removable front camper shell front window assembly, for the purposes of allowing quick removal of the front camper shell window, to facilitate cleaning of the truck window and camper shell window, or to allow substitution of a different front camper shell window, or a pressure boot. The invention allows use of either a picture window or a sliding window for the front camper shell window, or use of the pressure boot.

A one piece outer frame assembly is readily and quickly secured to, or removed from, the front camper shell window aperture; and either the picture window or sliding window, or the pressure boot, is readily and quickly secured within, or removed from, the outer frame assembly, through use of the structure detailed and claimed below.

BRIEF DESCRIPTION OF THE DRAWINGS

FIG. 3 is a plan view of the front sliding window insert, shown without any other components of the invention.

FIG. 4 is a sectional view, of a section perpendicular to the surface of the camper shell at the edge of the camper shell window aperture, showing details of connection of the front picture window insert, to the inside of the outer frame assembly, and showing details of connection of the outer frame assembly to the camper shell window aperture.

FIG. 5 is a sectional view, of a section perpendicular to the surface of the camper shell at the edge of the camper shell window aperture, showing details of the front sliding window insert.

FIG. 6 is a sectional view, of a section perpendicular to the surface of the camper shell at the edge of the camper shell window aperture, showing details of connection of the pressure boot, to the inside of the outer frame assembly, and showing details of connection of the outer frame assembly to the camper shell window aperture.

DESCRIPTION OF THE PREFERRED EMBODIMENTS

Figure 1:
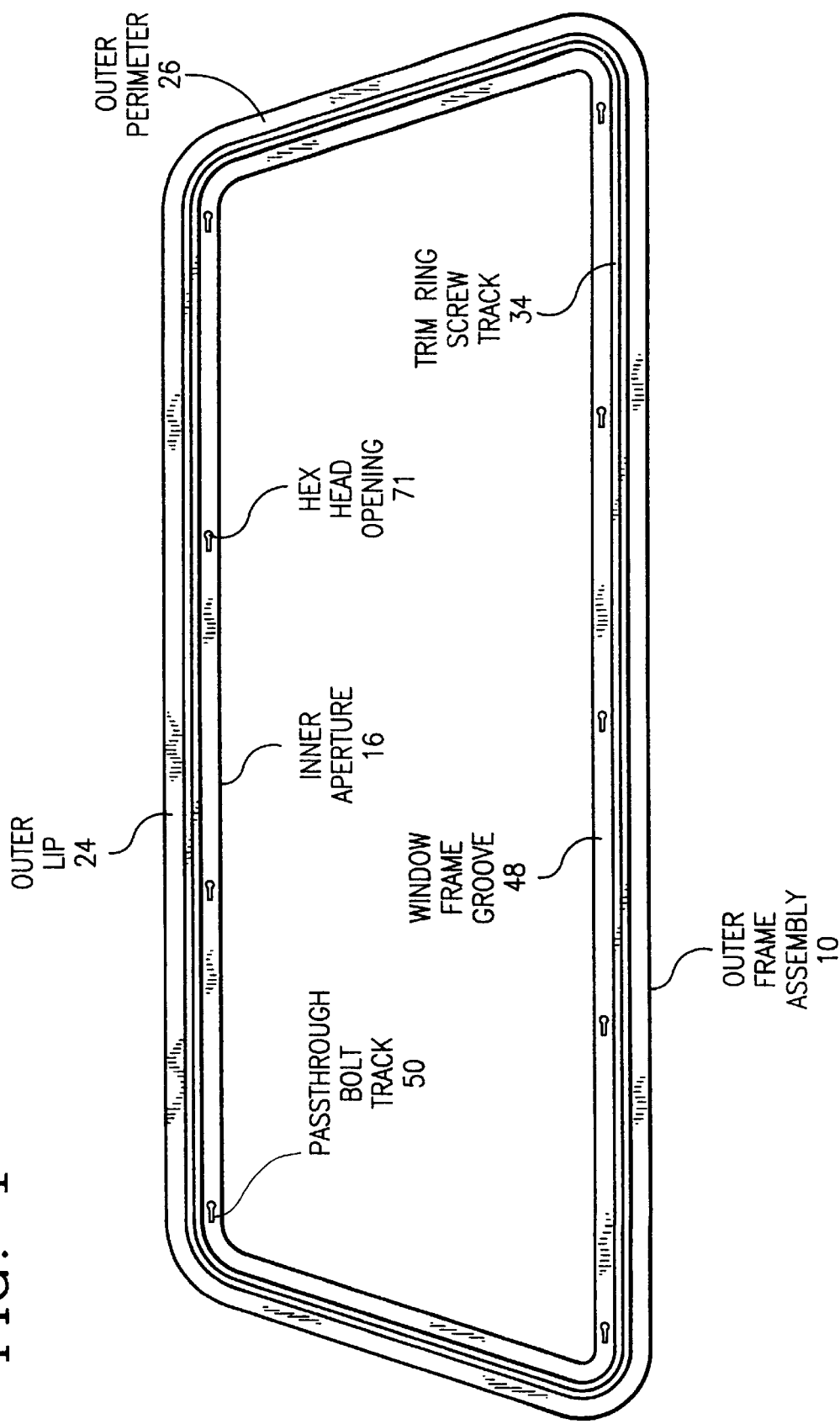
FIG. 1 is a plan view of the outer frame assembly, shown, for clarity, without any other components of the invention.

Referring now to the drawings, in which like reference numbers denote like or corresponding elements, it is useful to first summarize the principal components of the invention, followed by a review of structural and operational details, and concluding with a non-exhaustive review of possible variations among embodiments of the invention.

1. Principal Components

The outer frame assembly 10 is a one-piece metal unit, of trapezoidal form corresponding to a widely used camper shell window form, and open inside, which is readily installed within, or removed from, the camper shell window aperture 12 located in the front of camper shell 14, in the manner detailed below. The outer frame assembly 10 is the foundational unit of the invention, which receives one or another of the other major components, inserted within and secured to the inner aperture 16 of outer frame assembly 10, as detailed below. The other major components are: a front picture window insert 18; or a front sliding window insert 20; or a front pressure boot insert 22.

Although a particular owner might own and use only one of these inserts, the invention offers the three options of allowing an owner to use one of three inserts at a time, or switch between, either the front picture window insert 18, the front sliding window insert 20, or the front pressure boot insert 22, secured within outer frame assembly 10, with outer frame assembly 10 being itself secured within camper shell window aperture 12, in the manner detailed below.

2. Structural and Operational Details

The outer frame assembly 10, the portion of the present invention which mounts into camper shell window aperture 12 of camper shell 14 and which in turn receives either of the inserts already named, has an outer lip 24, extending fully around the outer perimeter 26 of outer frame assembly 10. The outer perimeter 26 of outer frame assembly 10, defined by the outer edge of outer lip 24, is larger than the camper shell window aperture 12, extending about ¾" beyond the edge of camper shell window aperture 12. The outer lip 24 is used to allow making a weather seal against camper shell 14, around the edges of camper shell window aperture 12, which seal may be completed by using cap tape weather seal 28 between the portion of outer lip 24 outside of camper shell window aperture 12, and camper shell 14.

The outer frame assembly 10 has a trim ring assembly 30, having an outer perimeter 32 slightly smaller than camper shell window aperture 12, so that trim ring assembly 30 extends somewhat within camper shell 14, through camper shell window aperture 12, when outer lip 24 of outer frame assembly 10 is sealed against camper shell 14 as already described. The thickness of trim ring assembly 30 (in the direction perpendicular to the plane of camper shell window aperture 12) is sufficient to allow the assembly 30 to extend slightly into the interior of camper shell 14, and is typically about ¼".

To secure the outer frame assembly 10 to camper shell window aperture 12, there are provided, in addition to the use of cap tape weather seal 28, as shown in FIG. 4, a trim ring screw track 34 on the inner edge of trim ring assembly 30, a trim ring 36, having an outer perimeter extending beyond the edge of camper shell window aperture 12, and having evenly spaced holes 38, and trim ring screws 40, which are used to secure trim ring 36 to the trim ring assembly 30 of outer frame assembly 10, by passing said screws 40 through said holes 38 and securing said screws into trim ring screw track 34, which track 34 is a groove into which the screws 40 thread themselves upon turning of the screws during installation of outer frame assembly 10. The trim ring 36 is one similar to that currently used in holding camper shell windows in place, and, as shown in FIG. 4, and has an outer portion 42 which extends beyond the edge of camper shell window aperture 12, and an inner portion 44, displaced longitudinally inward from outer portion 42 by a lip 46, which inner portion 44 contains the holes 38 for the screws 40 used to secure trim ring 36 to trim ring assembly 30 of outer frame assembly 10. The thickness of lip 46 is chosen, in relation to the thickness of trim ring assembly 30, such that, when trim ring 36 is thus secured to trim ring assembly 30 by screws 40, the outer portion 42 of trim ring 36 will press firmly against the inside of camper shell 14, around the edges of camper shell window aperture 12. Thus the outer frame assembly 10 is secured to the camper shell 14, at the camper shell window aperture 12, by the trim ring 36, secured to the trim ring assembly 30 by the screws 40, in concert with the outer lip 24 of outer frame assembly 10, sealed to camper shell 14 around the edge of camper shell window aperture 12.

The securing means described above, i.e. the combination of the outer lip 24, the cap tape weather seal 28, the trim ring assembly 30, the trim ring screw track 34, and the trim ring 36, with its array of holes 38 for screws 40, extend around the entire perimeter of camper shell window aperture 12 and outer frame assembly 10, so as to obtain-good-i-securing and sealing around the entire perimeter of camper shell window aperture 12. As seen in FIG. 4, below the trim ring assembly 30, the outer frame assembly 10 has a window frame groove 48 for receiving window inserts, said window frame groove 48 having a track 50 for holding ends of bolts 52, used in securing window inserts to outer frame assembly 10 as further detailed below. And, as also shown in FIG. 4, the inner edge or bottom of outer frame assembly 10 in the FIG. 4 view, has an inner edge lip 54, also used in securing operations for inserts as detailed below. The track 50 and lip 54 may extend around the entire perimeter of outer frame assembly 10, for ease of manufacturing; they preferably extend around at least substantially the entire perimeter.

Figure 2:
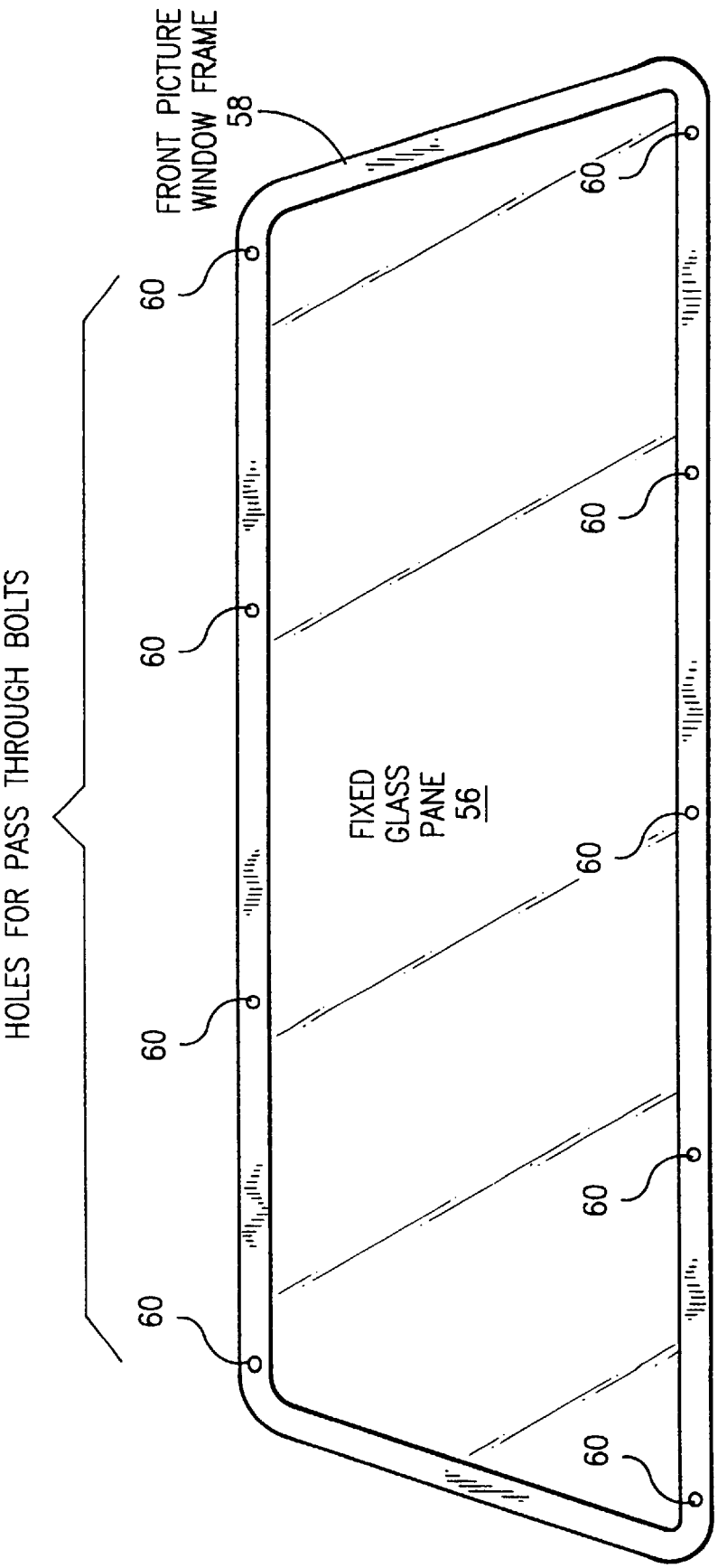
FIG. 2 is a plan view of the front picture window insert, shown without any other components of the invention.
Figure 7:
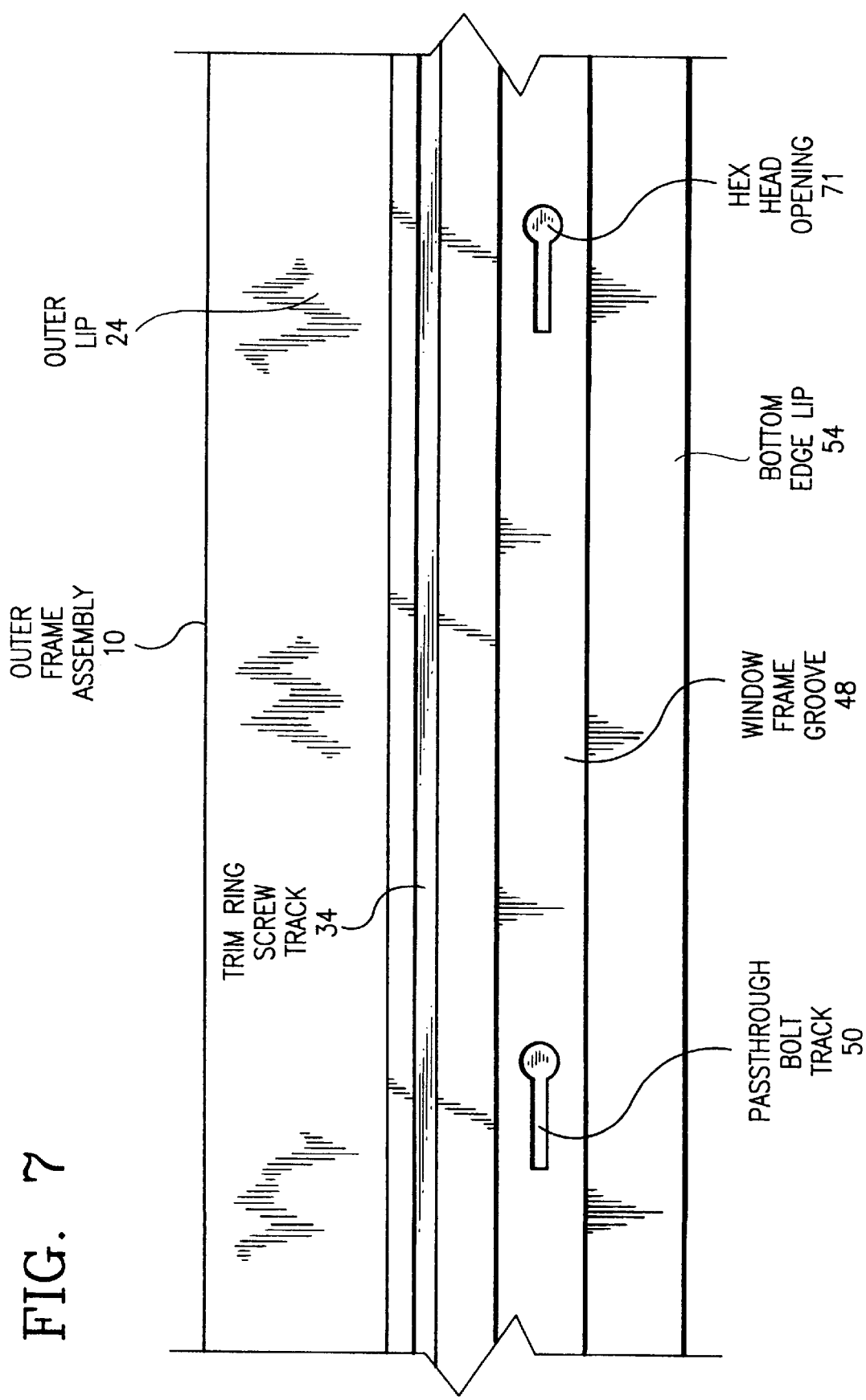
FIG. 7 is an expanded plan view of a portion of the perimeter of the outer frame assembly.

The front picture window insert 18, seen in FIGS. 2 and 4, is a framed tempered glass fixed window pane 56, mounted in a surrounding metal frame 58. As seen in the section in FIG. 4, the inner perimeter of frame 58 has an "h"—shaped configuration, with the outer edge of window pane 56 secured into the bottom of the "h" in the FIG. 4 view. The front picture window insert 18 is trapezoidal in shape like the outer frame assembly 10, only smaller, being sized to fit the window frame groove 48 of outer frame assembly 10. As seen in FIG. 2, the frame 58 of front picture window insert 18 has evenly spaced holes 60, for the bolts 52 used to secure front picture window insert 18 to the track 50 of outer frame assembly 10. The front picture window insert 18 also has a rubber tube gasket seal 62, seen in FIG. 4, which is sized to snap onto the inner lip 54 of outer frame assembly 10.

The front sliding window insert 20, seen in FIGS. 3 and 5, has tempered glass windows, with a sliding pane 64 in the center, and two fixed window panes 56 on the two sides thereof. The front sliding window insert 20 has a window frame 66, with window tracks 68 extending around the inner perimeter thereof, as seen in section in FIG. 5, which tracks 68 receive sliding pane 64 and fixed window pane 56. The frame 66 also has holes 60 evenly positioned around the perimeter thereof, just like front picture window insert 18, for bolts 52 used to secure front picture window insert 18 to the track 50 of outer frame assembly 10. And, like front picture window insert 18, front sliding window insert 20 is trapezoidal in shape like outer frame assembly 10, and sized to fit the window frame groove 48 of outer frame assembly 10. A suitable seal (not if shown), similar to gasket seal 62 used with front picture window insert 18, would also normally be used with front sliding window insert 20.

If the owner wishes to use a front pressure boot insert 22 instead of either front picture window insert 18 or front sliding window insert 20, the owner removes gasket seal 62 from lip 54 of outer frame assembly 10, and replaces gasket seal 62 with pressure boot material 70, slotted to snugly engage lip 54, as shown in FIG. 6.

Operation of the invention is straightforward, for inserting, removing and changing inserts, using the structures detailed above. To prepare the outer frame assembly 10 for installation, one places the cap tape weather seal 28 around the entire extent of outer lip 24. The cap tape weather seal 28 is also placed around the entire extent of the window frame groove 48, if needed for a watertight seal. One then snaps on the gasket seal 62, around the lip 54 of outer frame assembly 10.

To install a window insert, into outer frame assembly 10, one must first insert pass through bolts 52 into hex head opening 71 on outer frame assembly 10 and slide the pass through bolts 52 into pass through bolt track 50. One then selects the desired window insert, either front picture window insert 18, or front sliding window insert 20, and secures the desired insert to the outer frame assembly 10, with the edge of the insert fitting into window frame groove 48, by using bolts 52, passed through holes 60 to track 50 after lining up holes 60 with track 50 on window frame groove 48, and tightening bolts 52 with wing nuts 72, against washers 74, as seen in FIG. 4.

Then, one may readily install outer frame assembly 10, with the chosen window insert, to camper shell 14, by placing the outer frame assembly 10 against camper shell 14 on the truck side, centered in camper shell window aperture 12, with trim ring assembly 30 projecting into camper shell 14 through camper shell window aperture 12; and then securing outer frame assembly 10 to the interior of camper shell 14 by means of trim ring 36, placed within camper shell 14 and lined up with trim ring screw track 34, using screws 40 passed through each of the holes 38 in trim ring 36, and tightened, so as to secure trim ring 36 to outer frame assembly 10 and the inner wall of camper shell 14.

One may easily switch window inserts, from one to another, simply by loosening and removing the wing nuts 72 on each of the bolts 52, removing the one window insert, replacing it with the other, and then replacing and re-tightening the wing nuts 72, on each of the bolts 52. This is done from inside of camper shell 14, without any need for removing the outer frame assembly 10 from camper shell 14 or removing the camper shell 14 from the truck.

When one desires to use a pressure boot instead of one of the window inserts, the outer frame assembly 10 may be installed on camper shell 14 in the manner already described, except that one omits installing the gasket seal 62 on lip 54, and instead snaps the pressure boot material 70 onto lip 54, as seen in FIG. 6.

3. Some Possible Variations Among Embodiments

Those familiar with the art will appreciate that the invention may be employed in configurations other than the specific forms disclosed above, without departing from the essential substance thereof.

For example, and not by way of limitation, no particular materials are required for fabrication of the present invention. Although aluminum would be a suitable material, for the outer frame assembly and insert window frame components, having suitable strength and light weight, other suitable metals, alloys, or plastics might be used instead. Though the windows typically are transparent, either glass or plastics might be used; the windows may have artwork, decals, or paintings applied. The trapezoidal shape of the outer frame assembly and the window inserts simply corresponds to the shape of many present camper shell windows; the invention might of course instead be fabricated for use with camper shell windows of other shapes, such as rectangular windows sometimes used in aluminum camper shells.

The outer frame assembly 10 is preferably a one-piece unit, so that the owner has no need to assemble multiple pieces thereof. It might possibly be machined from a single piece of metal, or more commonly, fabricated from a plurality of pieces joined together during manufacture. Of course it would be possible to have an outer frame assembly 10 of multiple pieces assembled, e.g. screwed together, by the owner, but such would obviously be less convenient.

A typical manner of fabrication of the outer frame assembly 10, and the window frames 58 and 66 of front picture window insert 18 and front sliding window insert 20 would be to form long pieces of aluminum in the appropriate cross-sectional shapes shown in FIGS. 4, 5 and 6, and then heat the aluminum pieces and force them through a dye, after which the pieces are cut to the desired lengths and molded (bent) into the desired shapes (e.g. trapezoidal or rectangular) and then seamed together.

Some owners may decide to use the front pressure boot insert 22 along with either front picture window insert 18 or front sliding window insert 20; in this case the front pressure boot insert 22 should make it unnecessary to use a seal with the window insert.

The scope of the invention is defined by the following claims, including also all subject matter encompassed by the doctrine of equivalents as applicable to the claims.

We claim:

1. Apparatus, for use with a camper shell having a front camper shell window aperture, for readily securing at least one of a number of possible optional inserts into said aperture, and for readily removing said insert when desired, comprising:

an outer frame assembly, open inside of said assembly, having a shape at least substantially conforming to the shape of said camper shell window aperture, and having an outer perimeter slightly larger than the outer perimeter of said camper shell window aperture, and extending around at least substantially the entire perimeter of said camper shell window aperture;

a securing means, for securing said outer frame assembly to said camper shell window aperture;

an optional insert; and an insert securing means, for securing said optional insert to the interior of said outer frame assembly.

2. Apparatus of claim 1, wherein said optional insert is a fixed window insert, comprising a window frame and a fixed window mounted within said window frame.

3. Apparatus of claim 1, wherein said optional insert is a sliding window insert, comprising a window frame, and at least one fixed window, fixedly mounted within said frame, and at least one sliding window, slidably mounted within said frame.

4. Apparatus of claim 1, wherein said optional insert is a pressure boot.

5. Apparatus of claim 1, wherein said outer frame assembly is formed of a single piece of metal.

6. Apparatus of claim 1, wherein said outer frame assembly is aluminum.

7. Apparatus of claim 1, wherein said camper shell window aperture and said outer frame assembly are at least substantially trapezoidal in shape.

8. Apparatus of claim 1, wherein said camper shell window aperture and said outer frame assembly are at least substantially rectangular in shape.

9. Apparatus of claim 1, wherein said outer frame assembly is formed of a plurality of pieces of metal seamed together.

10. Apparatus of claim 1, further comprising an outer frame assembly sealing means, connected to said outer frame assembly, for weathertight sealing of said outer frame assembly to said camper shell window aperture.

11. Apparatus of claim 1, further comprising an insert sealing means, connected to said optional insert, for weathertight sealing said optional insert to said interior of said outer frame assembly.

\* \* \* \* \*